(12) United States Patent
Kawashima (10) Patent No.: US 8,052,330 B2
(45) Date of Patent: Nov. 8, 2011

(54) ROLLING APPARATUS

(75) Inventor: Sosuke Kawashima, Fujisawa (JP)

(73) Assignee: Coo Space Co., Ltd., Kanagawa (JP)

( * ) Notice: Subject to any disclaimer, the term of this patent is extended or adjusted under 35 U.S.C. 154(b) by 648 days.

(21) Appl. No.: 12/095,245

(22) PCT Filed: Nov. 24, 2006

(86) PCT No.: PCT/JP2006/323418
§ 371 (c)(1),
(2), (4) Date: May 28, 2008

(87) PCT Pub. No.: WO2007/063770
PCT Pub. Date: Jun. 7, 2007

(65) Prior Publication Data
US 2009/0268994 A1  Oct. 29, 2009

(30) Foreign Application Priority Data

Nov. 30, 2005 (JP) ................................. 2005-344905
Oct. 17, 2006 (JP) ................................. 2006-282327

(51) Int. Cl.
*F16C 33/58* (2006.01)
(52) U.S. Cl. .......................... 384/513; 384/43; 384/446
(58) Field of Classification Search .................. 384/451, 384/446, 513, 516, 535, 581, 43
See application file for complete search history.

(56) References Cited

U.S. PATENT DOCUMENTS

| | | | | |
|---|---|---|---|---|
| 4,898,481 A | * | 2/1990 | Hamblin | 384/581 |
| 4,909,641 A | * | 3/1990 | Mc Kenzie | 384/536 |
| 6,053,638 A | * | 4/2000 | Muraki et al. | 384/513 |
| 2003/0021504 A1 | * | 1/2003 | Tibbits | 384/513 |

FOREIGN PATENT DOCUMENTS

| | | | |
|---|---|---|---|
| EP | 1793135 A1 | * | 6/2007 |
| JP | 5246188 A | | 4/1977 |
| JP | 8166014 A | | 6/1996 |
| JP | 11303859 A | | 11/1999 |
| JP | 11325085 A | | 11/1999 |
| JP | 200363288 A | | 3/2003 |
| JP | 2003227515 A | | 8/2003 |
| JP | 2003239967 A | | 8/2003 |
| JP | 2003329099 A | | 11/2003 |

(Continued)

*Primary Examiner* — Thomas R Hannon
(74) *Attorney, Agent, or Firm* — The Webb Law Firm (57) ABSTRACT

In order to omit jostling caused between the adjacent rolling elements, a clearance is formed therebetween in a load region. A transfer path has a region that allows the rolling elements to contact only one of the transfer grooves of the transfer path, or a region that has a friction force acting between one of the transfer grooves of the transfer path and the rolling elements being greater than the friction force acting between another one of the transfer grooves of the transfer path and the rolling elements. The one of the transfer grooves in the region has a cross sectional shape taken in a direction perpendicular to the direction, in which the rolling elements are transferred, which cross sectional shape allowing two point contact with the rolling elements; and the rolling apparatus further has a contact-angle changing path that has a contact angle with the rolling elements that is greater than the contact angle of the other portion of the transfer path. Thus, the orbital motion speed of the rolling elements is changed.

17 Claims, 8 Drawing Sheets

FOREIGN PATENT DOCUMENTS

| | | |
|---|---|---|
| JP | 200468996 A | 3/2004 |
| JP | 200542795 A | 2/2005 |
| JP | 200569281 A | 3/2005 |
| JP | 200583520 A | 3/2005 |
| WO | 2004055416 A2 | 7/2004 |
| WO | WO 2006022321 A1 * | 3/2006 |

* cited by examiner

ROLLING APPARATUS

FIELD OF THE INVENTION

The present invention relates to an improvement in a rolling apparatus.

BACKGROUND OF THE INVENTION

In a rolling apparatus that has plural rolling elements interposed between a pair of transfer grooves while having no supporting cages, the respective rolling elements rotate on their axes in the same direction so that the surfaces of the adjacent rolling elements move in the opposite directions, which causes sliding friction due to the contact therebetween. Especially, it is known that the occurrence of contact between the adjacent rolling elements (hereinafter referred to "jostling") due to the slight difference in the orbital motion speed between the rolling elements (this difference is caused by the operational slippage of the rolling elements) in a region where the rolling element is subjected to load causes increase in frictional resistance, lubrication trouble due to the increase in pressure of the contacting surfaces, life shortening, occurrence of noise vibration, etc. In deal with them, it was proposed to provide a non-load region in a load region (cf. Patent Document 1, for example). There is also an invention to provide a distance between the adjacent rolling elements entering into the load region (cf. Patent Document 2).

Patent Document 1: Japanese Patent Application Laid-open No. 2003-227515

Patent Document 2: WO2004/055416 A2

The invention of Patent Document 1 proposes to improve jostling by providing a non-load region to balls which are jostling each other in a load region and therefore does not improve jostling itself in the load region. Even in the invention of Document 2, when plural balls, which are tightly contacting each other, enter into a portion to which friction is applied, they may enter into a load region while being held in tight contact with each other.

In order to solve the above conventional problems, it is an object of the present invention to provide a rolling apparatus that creates a distance between the adjacent rolling elements by increasing the orbital motion speed of a rolling element entering into the load region, and hence omits jostling in the load region. The above object and other objects of the present invention and the novel characteristics will more completely become apparent when reading the following description with reference to the attached drawings. It is to be noted that the drawings are presented to merely provide an explanation without intention to limit the present invention to the scope of the disclosure.

SUMMARY OF THE INVENTION

Problems to be Solved by the Invention

In order to achieve the above objects, according to the present invention, there is provided a rolling apparatus characterized in that it includes a transfer path made up of at least one pair of transfer grooves; and plural rolling elements interposed in the transfer path in such a manner as to be capable of freely rolling, wherein the rolling elements have any one of a spherical shape, a cylindrical shape having opposite corners three-dimensionally curved, a conical shape, a barrel shape and a complex curved shape thereof; said transfer path has a region that allows the rolling elements to contact only one of the transfer grooves of the transfer path, or a region that has a friction force acting between one of the transfer grooves of the transfer path and the rolling elements being greater than the friction force acting between another one of the transfer grooves of the transfer path and the rolling elements; the one of the transfer grooves in the aforesaid region has a cross sectional shape taken in a direction perpendicular to the direction, in which the rolling elements are transferred, which cross sectional shape allowing two point contact with the rolling elements; and said rolling apparatus further has a contact-angle changing path that has a contact angle with the rolling elements that is greater than the contact angle of the other portion of the transfer path.

According to the present invention, there is provided a circulation-type rolling apparatus characterized in that it includes a transfer path made up of at least one pair of transfer grooves; plural rolling elements interposed in the transfer path in such a manner as to be capable of freely rolling; and a circulation path having opposite ends connected to one of the transfer grooves so as to allow the rolling elements to be capable of being circulated; wherein the rolling elements have any one of a spherical shape, a cylindrical shape having opposite corners three-dimensionally curved, a conical shape, a barrel shape and a complex curved shape thereof the rolling elements within the transfer path are drawn into the circulation path through one end of the circulation path and returned through the opposite end of the circulation path to the transfer path; at least one end of the circulation path has a cross sectional shape taken in a direction perpendicular to the direction in which the rolling elements are circulated, which cross sectional shape allowing two point contact with the rolling elements; and said rolling apparatus further has a contact-angle changing path that has a contact angle with the rolling elements that is greater than the contact angle of at least one of the other portion of the circulation path and/or the transfer path.

According to the present invention, for the transfer path that has the region that has a friction force acting between one of the transfer grooves of the transfer path and the rolling elements being greater than the friction force acting between another one of the transfer grooves of the transfer path and the rolling elements, the rigidity in a direction perpendicular to the transfer direction is smaller than the other portion of the transfer path, or the distance between the transfer grooves is greater than the other portion to have a non-load region that allows the rolling elements to be slightly held between the transfer grooves.

According to the present invention, the surface of the contact portions of the contact-angle changing path with the rolling elements is rougher than the surface of the contact portions of the opposite transfer groove with the rolling elements.

According to the present invention, the shape of the contact-angle changing path in the transfer direction is curved in such a direction as to have the contacting surface with the rolling elements be the inner surface.

According to the present invention, a ferromagnetic material is used as the material of the rolling elements and magnetic force is applied to the contact-angle changing path.

According to the present invention, the contact angle at a center of the contact-angle changing path is greater than the contact angle of any one of the other portion of the transfer path and the circulation path, and is gradually decreased towards the opposite ends thereof.

According to the present invention, a means for deforming the transfer grooves to change the contact angle relative to the transfer direction of the rolling elements in the contact-angle changing path is provided in an external structure of the transfer grooves.

According to the present invention, there is provided a method of forming a transfer groove that has a concave surface in cross section taking in a direction perpendicular to the transfer direction of a rolling apparatus that has rolling elements interposed therein, characterized in that it includes forming a transfer groove having a uniform cross sectional shape while elastically deforming a region of a rolling-element contacting portion along a direction in which the rolling elements of the transfer groove are transferred, in such a direction as to allow the curvature of the concave surface to be greater than the other portion, and then releasing the elastic deformation, thereby allowing the curvature of the groove of the aforesaid region of the transfer groove to be smaller than the other portion.

According to the present invention, there is provided a method of using a rolling apparatus that has a transfer path made up of at least one pair of transfer grooves and plural rolling elements interposed in the transfer path in such a manner as to be capable of freely rolling, and at least, one of the transfer grooves has a concave surface in cross section taken in a direction perpendicular to the direction in which the rolling elements are transferred, characterized in that the rolling apparatus is used while being deformed in such a direction as to allow the curvature of the concave surface of the transfer groove in a region that is subjected to smaller load from the rolling elements than the other region does to be smaller than the other portion.

Advantages of the Invention

According to the present invention, when the rolling elements enter into the contact-angle changing path, the orbital motion speed of the rolling elements is decreased, and when the rolling elements move out of the contact-angle changing path, the orbital motion speed of the rolling elements is increased, so that a distance is created between the adjacent rolling elements that have moved out from the contact-angle changing path, and hence it is possible to prevent jostling in the load region. Whereby, it is possible to suppress increase in frictional resistance, lubrication trouble, life shortening, occurrence of noise vibration, etc., due to the jostling. Furthermore, the necessity to provide the supporting cages for supporting the rolling elements with a constant distance from each other can be omitted, with the result that limitation such as temperature due to the material of the supporting cages is not necessarily applied, and the spaces occupied with the supporting cages can be used for the rolling elements, thereby achieving an increased load carrying capacity, etc.

BRIEF DESCRIPTION OF THE DRAWINGS

FIGS. 1 are cross sectional views of a non-circulation, linear motion guiding apparatus of the present invention, in which

FIGS. 2 are cross sectional views of a two-point contact ball bearing of the present invention, in which

FIGS. 4 are cross sectional views of a four-point contact ball bearing of the present invention, in which

FIGS. 5 are cross sectional views illustrating the method of use of the two-point contact ball bearing of the present invention, in which

FIGS. 8 are cross sectional views of a circulation-type linear motion guiding apparatus of the present invention, in which

DESCRIPTION OF THE REFERENCE CODES a: Contact-angle changing path
b, c: Nut grooves
d: Ridge lines between the nut grooves b, c and a gothic-arch groove
f, g. Rotation center axis of balls
F: Upper load
F1: Uniformly-distributed load
Fa: Axial load
M: Bending moment
Y: Orbiting distance
θ, β: Contact angle
α: Rotation angle
r: Ball radius
r1: Distance between the ball center and the ball contact point of a transfer groove 1
r2: Distance between the ball center and the ball contact point of a transfer groove 2
1, 2, 60: Transfer grooves
3: Ball
3a Elastic ball
4: Trajectory of the contact point between the ball and the transfer groove 4a: Trajectory of the contact point between the ball in the contact-angle changing path and the transfer groove
   11: Outer ring
   11a: Outer-ring cutout
   11b: Outer-ring cut portion
   12: Inner ring
   13: Load region
   14: Non-load region
   21, 22: Rails
   31: Escape
   41, 42: Circulation parts
   43: Elastic part
   51: Groove having a wedge-like cross section
   52: Wedge
   53: Shape of the groove after the wedge has been pressed thereinto
   53a: Shape of the groove before the wedge is pressed thereinto
     55: Lower trajectory shaft
     56: Upper trajectory shaft
     57: Base
     58: Escape groove
     59: Roller
     61: Rail
     62: Slider body
     63: End cap
     64: Magnet
     65: Opening
     66 Clearance
     67: Return path
     68: Tongue
     69: Turnaround path
     69a: Approaching portion of a turnaround path
     71: Screw shaft
     72: Nut
     73: Circulation part
     73b: Large portion of the contact angle of a circulation path
     73c: Small portion of the contact angle of a circulation path
     81: Groove

BEST MODE FOR CARRYING OUT THE INVENTION

Now, the description will be made for a rolling apparatus of the present invention with reference to the attached drawings.

Embodiment 1

Figures 1A, 1B, 1C:
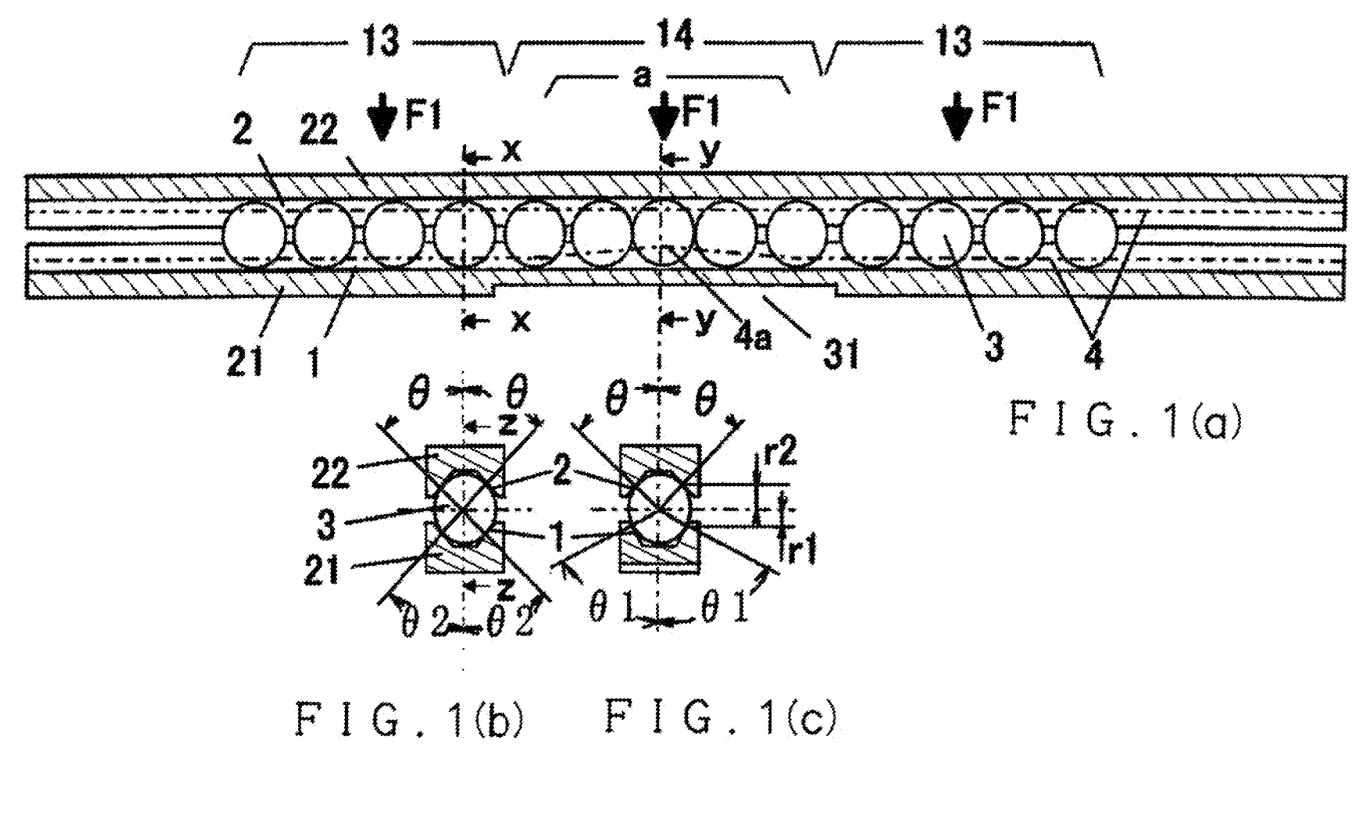
FIG. 1(a) is a cross sectional view taken along a line of Z-Z in FIG. 1(b)
FIG. 1(b) is a cross sectional view taken along a line of X-X in FIG. 1(a)
FIG. 1(c) is a cross sectional view taken along a line of Y-Y in FIG. 1(a) (Embodiment 1).

FIG. 1(a) is a cross sectional view of a non-circulation, linear motion guiding apparatus of the present invention in a direction parallel to the motion thereof. The non-circulation, linear motion guiding apparatus is made up of a rail 21 having a V-like transfer groove 1, a rail 22 having a V-like transfer groove 2 disposed opposite to the rail 21, and plural balls 3 interposed between the transfer grooves in such a manner as to be capable of rolling. The contact angle θ of the V-groove of the transfer groove 2 with the balls is 45° throughout the entire length; the contact angle of the V-groove of the transfer groove 1 with the ball is $\theta_1=60°$ in the Y-Y cross section illustrated in FIG. 1(c), and $\theta_2=45°$ in the X-X cross section illustrated in FIG. 1(b); and a contact-angle changing path "a" is provided between the Y-Y cross section and the X-X cross section to change the contact angle continuously from 60° to 45°. A dashed line 4 represents a trajectory of the contact point with the ball on the transfer grooves, in which the contact angle of the transfer groove 1 is increased at 4a.

In the opposite areas surrounded by the contact-angle changing path "a", the surface is processed to be rougher than the transfer groove 2 so as to have a high sliding friction coefficient relative to the rolling elements. An escape 31 is formed on a back surface of the transfer groove of the rail 21 through an area covering the contact-angle changing path "a".

When the linear motion guiding apparatus is subjected to uniformly-distributed load F1, the rail is bent at the escape 81 so that the contact-angle changing path "a" is less likely to be subjected to the load, thereby forming a non-load region 14 in which the balls are slightly held by the transfer grooves. A load region 13 is a region other than the non-load region 14 within an area in which balls are interposed. The orbiting distance Y of the balls in this arrangement may be represented by the following expression (the unit symbol [°] represents an angle [deg]) on the assumption that slipping of the balls does not occur relative to the transfer grooves.

Orbiting distance Y [mm] of the balls relative to the transfer groove 1, $Y=Xr_1/(r_1+r_2)$
   X: Relative moving distance [mm] to the transfer groove 1 and the transfer groove 2
   r1: Distance [mm] between the ball center and the ball contact point of the transfer groove 1, $r_1=r\cos\theta_1$
   r2: Distance [mm] between the ball center and the ball contact point of the transfer groove 2, $r_2=r\cos\theta_2$
   r: Ball radius [mm]
   θ1: Contact angle [°] of the transfer groove 1 to the balls
   θ2: Contact angle [°] of the transfer groove 2 to the balls In FIG. 1(a), the orbiting distance of each ball becomes the following according to the above expression when the ball radius is 2.5 mm and when the rail 21 is fixed and the rail 22 is moved 1 mm to the left side.

For the ball having a contact angle of 45° in the load region: Y=0.5 mm

For the ball having a contact angle of 60° in the non-load region: Y=0.414 mm

The orbiting distance of the center ball relative to the transfer groove 1 is smaller than that of the balls in the load region. The middle region between the contact angles of 45° and 60° exhibits the medium characteristics thereof. On the other hand, the orbiting distance of the ball relative to the transfer groove 2 remains unchanged since the contact angle of the transfer groove 2 remains constant. However, in this arrangement, the sliding friction coefficient of the transfer groove 1 relative to the balls is set to be greater than that of the transfer groove 2, thereby causing slippage between the transfer groove 2 and the balls, of the portion of the contact-angle changing path "a", and thus reducing the orbiting distance of the center ball. Since the contact-angle changing path "a" is less likely to be subjected to load by the escape groove 31, the increase of the friction due to this slippage is very small.

With the above structure, when the rail 22 is operated, the balls move so that the balls advancing towards the center of the contact-angle changing path slow down, while the balls advancing through the contact-angle changing path towards the load region speed up, As a result, the balls have a distance therebetween gradually decreased when they are moving to the center from the load region, and the balls contact each other or come closer to each other around the center of the contact-angle changing path; and on the other hand, the balls have a distance therebetween gradually increased when they are moving from the center to the load region, and hence they can have a predetermined distance therebetween when entering into the load region.

By this "predetermined distance" is meant such a distance as to prevent balls, which have contact each other in the non-load region and then have entered into the load region while having a distance therebetween thanks to the above action, from contacting each other again due to the operational slippage in the load region. And, this predetermined distance is a value to be determined on an experimental basis by the operational conditions, the settings of the contact angle of each transfer groove, the surface roughness or the like, and is, for example, 0.1 mm to 1 mm, or 3 mm for the rolling apparatus of a large size. The above description was made by taking, for example, a case where the rail 21 is fixed and the rail 22 is moved to the left side, but the same effect can be produced even when the rail 22 is moved to the right side, the rail 21 is moved, or both the rails are moved.

The escape 31 of FIG. 1 or non-load region may not be provided depending on the conditions, such as a condition where the applied load is very small; a condition where the friction due to the operational slippage is utilized for the purpose of enhancing the decreasing characteristics of the linear motion guiding; and a condition where a sufficient amount of lubricant can be supplied into a region in which the operational slippage is occurring. Furthermore, the friction coefficient of the transfer grooves facing the contact-angle changing path may be decreased by, for example, being coated with a film having a low friction coefficient rather than increasing the sliding friction coefficient of the contact-angle changing path "at". In FIG. 1, the present invention is described as the non-circulation type, linear motion guiding apparatus, but the present invention is not necessarily limited thereto. The present invention may be applicable to a ball-screw apparatus (e.g., Japanese Patent Application Laid-open No. 2005-69281) and the like.

Embodiment 2

FIG. 2(*a*) is a cross sectional view of a two-point contact ball bearing of the present invention. The two-point contact ball bearing is made up of an outer ring 11 having on its inner circumference a transfer groove 1, an inner ring 12 having on its outer circumference a transfer groove 2, and ten balls 3 and four elastic balls 3*a* interposed between a pair of these transfer grooves in such a manner as to be capable of freely rolling. The transfer grooves have a single rounded shape with basically a contact angle of 0°, while the contact angle is gradually and symmetrically increased from a Z-Z cross section to a Z'-Z' cross section, of the outer ring transfer groove 1, thereby forming a contact-angle changing path "a" having a maximum angle θ3 (e.g., 45°) at the X-X cross section illustrated in FIG. 2(*b*). A dashed line 4*a* represents a trajectory of the contact point of the ball and the outer ring transfer groove in the contact-angle changing path.

Figure 2A:
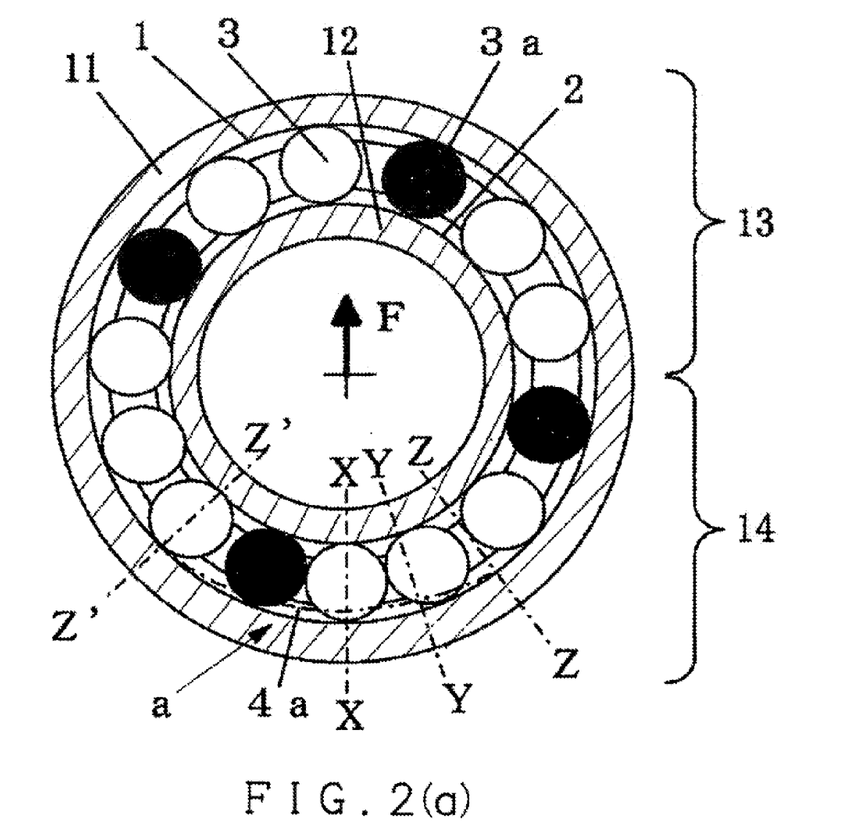
FIG. 2(a) is a cross sectional view in the direction perpendicular to the axis.
Figure 2B:
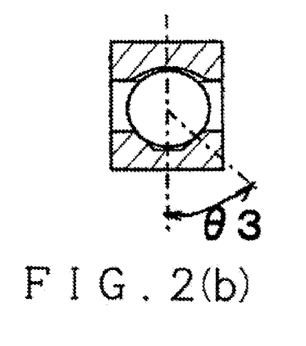
FIGS. 2(b), 2(c) and 2(d) are cross sectional views in the direction perpendicular to the transfer direction (Embodiment 2).
Figure 2C:
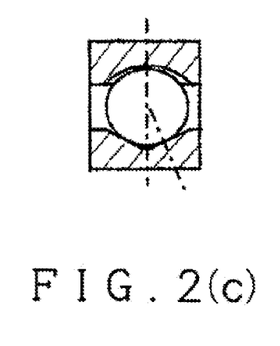
Figure 2D:
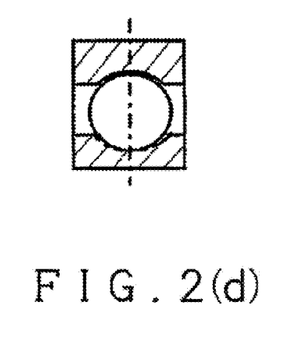

The number of the balls 3 of this bearing is limited to the number which can be incorporated from a gap formed by displacing the inner ring towards one side of the outer ring. Therefore, in this embodiment, in order to prevent the balls 3 from gathering at a portion of a transfer path, the four elastic balls 3*a* are deformed with pressure and incorporated into the transfer path through a gap between the inner ring and the outer ring, in place of supporting cages.

This ball bearing is used with the outer ring fixed and the inner ring rotatable, and when an upper load F is applied to the inner ring, the illustrated upper half 13 and lower half 14 respectively become a load region and a non-load region. When the inner ring 12 is rotated in a clockwise direction (CW), the balls each orbit or revolve in the clockwise direction while rotating about its own axis in the anti-clockwise direction in the load region along with the inner ring. After entering into the non-load region, they move on the transfer groove 1 of the outer ring and enter into the contact-angle changing path "a" through the Z-Z cross section while keeping the rotating direction and the orbital motion direction, due to the inertia force and the centrifugal force, separately from the inner ring.

During the travel of the balls from the Z-Z cross section to the X-X cross section, of the contact-angle changing path, the orbital motion speed is decreased, while on the other hand the rotation speed is increased (due to the conversion of the orbital motion energy to the rotation energy), the adjacent balls contact each other or come closer to each other at the X-X cross section. When the balls orbit or revolve in the clockwise direction passing the X-X while rotating in the anti-clockwise direction, the orbital motion speed of the balls is increased and the rotation speed of the same is decreased, contrarily (due to the conversion of the rotation energy to the orbital motion energy), and each ball enters into the load region with a distance away from the following ball.

Since the motion of each ball cannot be strictly controlled, it is assumed that the balls do not contact each other at a portion around the X-X cross section. However, even in that case, they merely enter into the load region while having a greater distance from each other, and therefore the advantages of the present invention are not deteriorated. For an application in which the loading direction is varied synchronously with the rotation angle, such as a bearing for rotation support of a mass that is not coincident with the rotational axis, it is possible to produce the same advantages by making the mounting phase of the mass oriented in the X-X direction so that the load, such as the centrifugal force due to the mass makes the contact-angle changing path to be the non-load region while having the inner ring fixed and the outer ring rotatable in this Figure.

The non-load region of FIGS. 2 is created by a radial clearance that is in turn caused by the load F, but it is possible to allow a radial clearance to be caused in a state where no external load is being applied, or employ a preloaded bearing, in which the contact-angle changing path is formed with a depth greater than the other transfer groove portion, thereby forming a clearance relative to the balls.

For a material of the elastic balls 3*a*, it is possible to use a thermoplastic elastomer material or the like since no jostling with the balls 3 is caused thanks to the above action. It is also possible to employ an arrangement, in which the elastic balls 3*a* are composed of remarkably flexible hollow balls that are incorporated into the transfer groove while they have been compressed, then epoxy resin or the like is injected into these balls and cured, thereby allowing the balls to have a spherical outline. Furthermore, it is possible to employ an arrangement, in which no elastic balls 3*a* are used, and ball inserting grooves are respectively formed in the outer ring and the inner ring, thereby allowing a larger number of the balls to be incorporated into the transfer groove. In this case, it is possible to employ a structure to close the grooves after the incorporation of the balls so as not to cause drop-off of the balls from the ball inserting grooves (e g., Japanese Patent Application Laid-open No. Hei-11-325085). The shape of a groove that continuously changes the contact angle is preferably formed by forming the transfer groove by injection molding of plastic or metal, or press molding of a metal plate.

Embodiment 3

Figure 3:
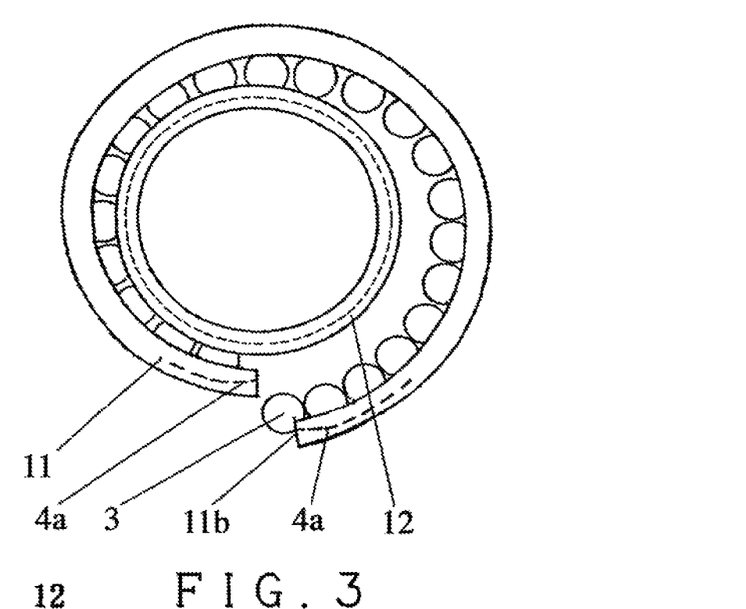
FIG. 3 is a conceptual view illustrating a ball incorporation method of a two-point contact ball bearing of the present invention (Embodiment 3).

FIG. 3 is a conceptual view illustrating a ball incorporation method of a two-point contact ball bearing according to another embodiment of the present invention. The outer ring 11 has an outer ring cut portion 11*b*, and the incorporation of the balls 3 is made by opening this cut portion so that the balls can be placed in the transfer path without substantial clearance. In actual use, the outer ring is incorporated into an housing (not illustrated) having a size fitted to the outer diameter of the outer ring and the width of the outer ring to allow the cut faces of the outer ring to be brought into abutting engagement, thereby forming a bearing shape similar to that of FIG. 2. By forming the non-load region and the contact-angle changing path in the cut portion of the outer ring, there is provided a structure to minimize the friction variation due to a slight dislocation of the transfer groove at the cut faces, and to allow the balls entering into the non-load region while providing a constant distance therebetween.

In the Figure, the outer ring is opened in the radial direction to secure a ball inserting space, but the ball inserting space may be secured by twisting the outer ring in the axial direction. The cut portion may be formed in the inner ring. This bearing is suitable for forming the transfer groove by press working of a thin metal plate or injection molding of a resin.

Embodiment 4

Figure 4A:
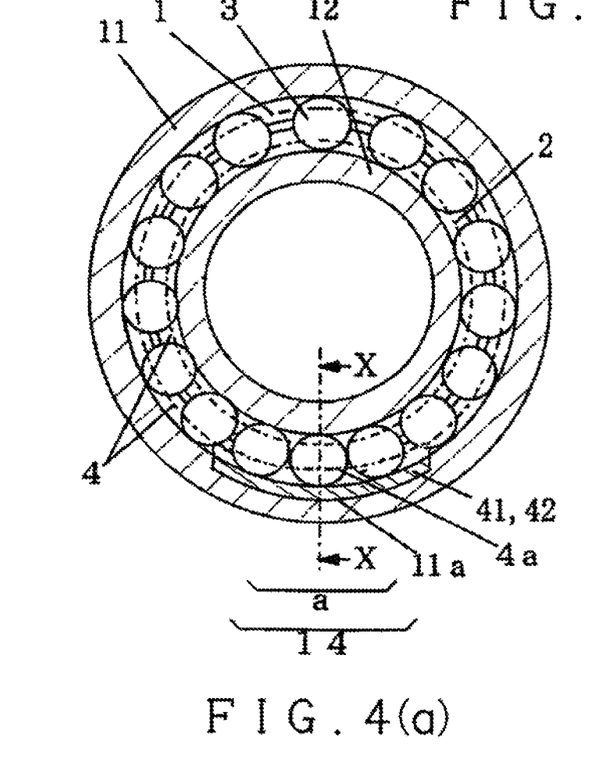
FIG. 4(a) is a cross sectional view in the direction perpendicular to the axis and FIG. 4(b) is a cross sectional view in the direction perpendicular to the transfer direction (Embodiment 4).
Figure 4B:
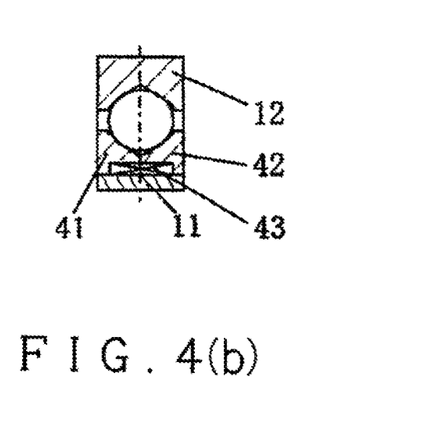

FIGS. 4 are cross sectional views of a four-point contact bail bearing of the present invention, in which the transfer groove is basically of a gothic-arch shape to allow a single bearing to be subjected to both great axial load and moment load, the contact points in total are four with two point contacts by the inner ring and two point contacts by the outer ring. The outer ring cut portion la is formed in a transfer groove portion of the outer ring 11, and two halved circulation parts 41, 42 are fitted to this cut portion.

The transfer grooves of the circulation parts 41, 42 together form a contact-angle changing path "a" having the opposite ends at which the contact angle is the same as that of the outer ring transfer groove and the center at which the contact angle is greater than that of the outer ring transfer groove. This contact-angle changing path is worked to have a rough surface, thereby allowing the friction coefficient thereof with the balls to be higher than that of the inner ring transfer groove (a dashed line 4 represents a trajectory of the contact point of the transfer groove of the inner ring or outer ring with the balls, and a dashed line 4a represents the trajectory of the contact point of the contact-angle changing path of the outer ring transfer groove). The non-load region 14 is formed in a portion contacting the outer ring of the opposite side of the transfer groove, in which the circulation parts are elastically fitted in the radial direction of the bearing into the outer ring with the elastic parts 43 held therebetween.

With this bearing, all the balls are placed in the transfer groove through the outer ring cut portion 11a while one of the circulation parts 42 is not attached, and then the cut portion 11a is closed by the circulation part 42. In FIGS. 4, the circulation parts 41, 42 are not fixed in the axial direction to the outer ring, and these circulation parts are fixed in contact with shoulder portions of the housing (not illustrated) that are fitted around the outer ring of the bearing when in incorporation into the apparatus. However, it is possible to provide a separate means for fixing the circulation parts to the outer ring. The spring constant and bending margin, of the elastic part 43 are set so that the sum of the load to be applied to the rolling elements in the contact-angle changing path "a" becomes ⅒ or lower, and preferably ¹⁄₁₀₀ or lower, of the dynamic load rating.

According to the structure of this embodiment, when a hall enters into the contact-angle changing path "a" of the circulation parts, the contact angle thereof becomes gradually large, and at the same time the orbital motion speed of the ball is lowered by the operational slippage between the inner ring and the ball since the friction coefficient of the circulation parts is greater than that of the inner ring, and thus the adjacent balls contact each other or come closer to each other. When the ball has passed the center of the contact-angle changing path, the contact angle thereof becomes gradually small, so that the orbital motion speed of the ball is increased while causing the operational slippage, and thus the adjacent balls are separated away from each other and rolls into the outer ring through the circulation parts.

In order to prevent impact due to the external load when a ban transfers from the transfer groove of the circulation parts to the transfer groove of the outer ring, it is preferable to relax the stress concentrated to the outer ring by providing appropriate crowning on the cut portion of the outer ring. The circulation parts are preferably made of such a material as to enable the groove shape with its contact angle being continuously changed to be easily molded (by, for example, injection molding of plastic or metal, powder metallurgy molding, or press molding of a metal plate).

Since the circulation parts are not subjected to large loads and therefore do not require hardness or strength required for the inner ring, the outer ring or balls, the material, shape or the like is determined to have an appropriate spring constant, thereby requiring no elastic part 43. In this embodiment, the circulation parts are provided in the outer ring, but instead, it is possible to provide the same in the inner ring. The forming of the contact-angle changing path by the circulation parts maybe applicable to the two-point contact ball bearing of Embodiment 2 (e.g., a deep groove ball bearing), or an angular ball bearing (e.g., a hub bearing for vehicles) having a contact angle.

Embodiment 5

Figure 5A:
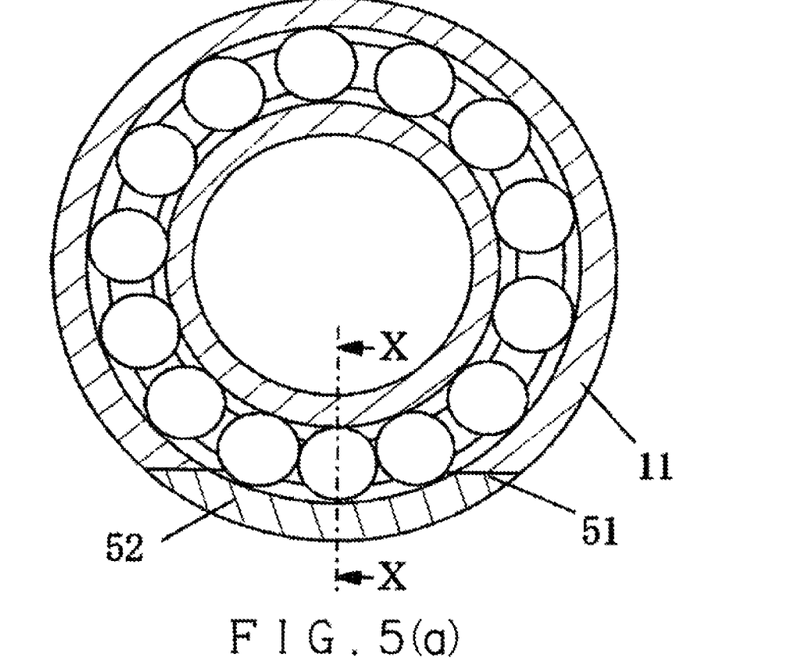
FIG. 5(a) is a cross sectional view in the direction perpendicular to the axis and FIG. 5(b) is a cross sectional view in the direction perpendicular to the transfer direction (Embodiment 5).
Figure 5B:
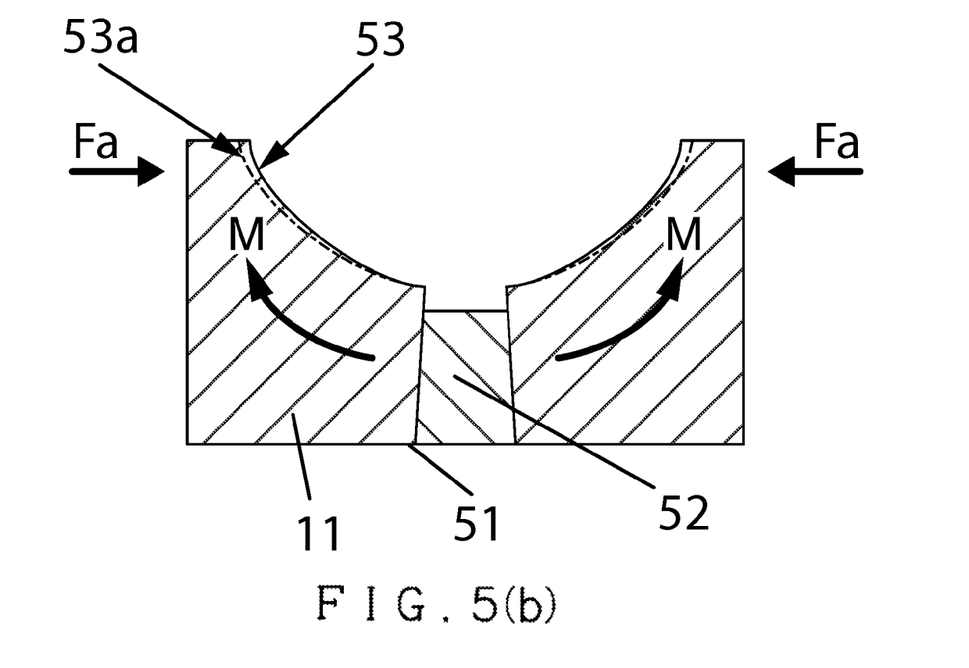

FIG. 5(a) is a cross sectional view of a ball bearing which has a means for deforming the transfer grooves, in which the present invention is carried out without performing a special transfer groove working. A transfer groove of each of the inner and outer rings of this Figure has a single R-shape that is uniform throughout the entire circumference. As illustrated in FIG. 5(b), the means includes a groove 51 having a wedge-like cross section, which extends through the transfer surface in parallel with the ball transfer direction and is formed in a portion of the outer ring 11. A wedge 52 is pressed into this groove, causing a bending moment M that in turn deforms the shoulder portions of the outer ring towards the inner side, and thus the contact-angle changing path is formed. A reference numeral 53 represents the shape of the transfer groove after the press-in of the wedge and a reference numeral 53a represents the shape of the transfer groove before the press-in of the wedge.

The contact point of the outer ring transfer groove with the balls is located along the center of the transfer groove in a portion having no groove 51. In a portion having the groove, the shoulder portions of the transfer groove are deformed to allow the groove to have a gothic-arch groove, in which portions around the shoulder portions become contact points. Thus, in the distance through which the inner ring is rotated and thus the balls orbit or revolve in the direction of the groove 53, the balls come closer to each other or contact each other; and in the distance through which the balls separate away from the groove, a space can be caused between the adjacent balls. The means for deforming the transfer grooves for forming the contact-angle changing path in a transfer groove having a uniform shape is not limited to the above means.

Another example of a means for deforming the transfer grooves includes, as a bearing, a conventional deep groove ball bearing that has a uniform R-groove through the entire circumference, and stepped portions for contact with the shoulder portions of the outer ring formed on a housing for supporting the outer ring of the bearing (e.g., Japanese Patent Application Laid-open No. Hei-11-303859, FIG. 1). Projections are formed on the stepped portions of the housing that contact the shoulder portions of the outer ring in a region in which the load to be applied onto the outer ring of the bearing when in use is small, and then the bearing is incorporated into the housing. Then, a press lid having similar projections at portion respectively facing the projections of the housing is used to tightly secure the outer ring of the bearing with pressure, and thereby the axial direction loads Fa illustrated in FIG. 5(b) are applied to the shoulder portions of the bearing, thereby forming a contact-angle changing path that allows the outer ring (or inner ring) to have an increased contact angle.

In an application in which the balls are subjected to loads through the inner and outer rings even in a region in which the load to be applied to the outer ring of the bearing when in use is small, the surface of the contact-angle changing path is roughened, lubricating oil is injected into the transfer groove of the inner ring (or outer ring) of the side opposite to the contact-angle changing path, or any other means is employed, thereby making it possible to increase the frictional force of the contact-angle changing path against the opposite transfer groove. The incorporation of the balls into the inner and outer rings is achieved by the ball inserting grooves described in Embodiment 2.

According to the above structure, even in a case where a bearing steel or the like is used, to which grinding must be made to form a transfer groove of the outer ring, it is possible to easily form the contact-angle changing path, and furthermore carry out the present invention by an easily and commercially available bearing. Although this embodiment was described by taking, for example, the case in which a contact-angle changing path is formed in an outer ring transfer groove having a uniform cross-sectional shape, it is a matter of course to form the contact-angle changing path not in the outer ring but in the inner ring. The housing described above is a casing of such as a transmission for an automobile, and in this case, the rolling apparatus is a transmission for an automobile.

Embodiment 6

Figure 6:
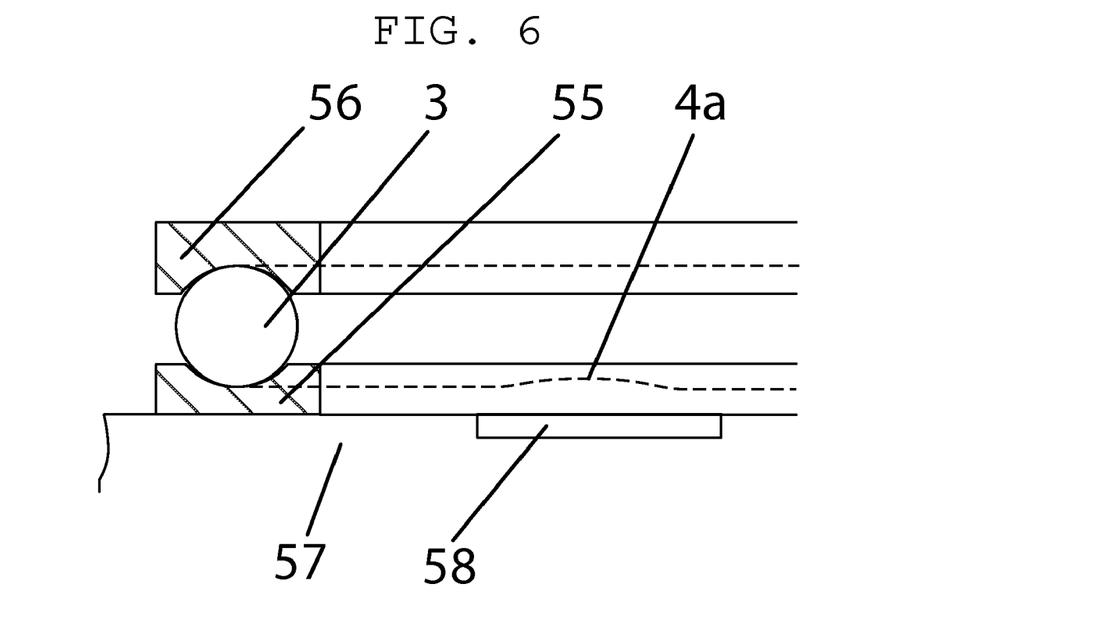
FIG. 6 is a cross sectional view of a two-point contact thrust ball bearing in the direction perpendicular to the transfer direction (Embodiment 6).

FIG. 6 illustrates a two-point contact thrust ball bearing that is made up of a lower trajectory shaft 55, an upper trajectory shaft 56 and balls 3 interposed between the lower trajectory shaft and the upper trajectory shaft. The bearing contacts the balls at two points in a portion of the transfer groove of the lower trajectory shaft 55, and has a contact-angle changing path that has a contact-point trajectory as represented by a dashed line 4a. An escape groove 58 is formed in the contact-angle changing path of a base 57 that secures the lower trajectory shaft, and this portion acts as a non-load region. Regarding the frictional force between the balls and the trajectory shafts, the frictional force of the lower trajectory shaft 55 is greater than that of the upper trajectory shaft 56 due to the ball's weight, so that it is possible to provide the function of securing a clearance between the adjacent balls in the load region of the present invention.

There is also provided a thrust bearing that has a transfer groove on the upper side of the upper trajectory shaft of the thrust bearing, a trajectory shaft is provided thereon to be integrally formed with the lower trajectory shaft, and balls interposed therebetween, thereby holding the upper trajectory shaft from the upper and lower sides (e.g., Japanese Patent Application Laid-open No. 2003-63288). In this form of the bearing, it is also possible to achieve the function of the present invention by forming one of the transfer grooves into the above shape, for each line of balls.

Embodiment 7

Figure 7:
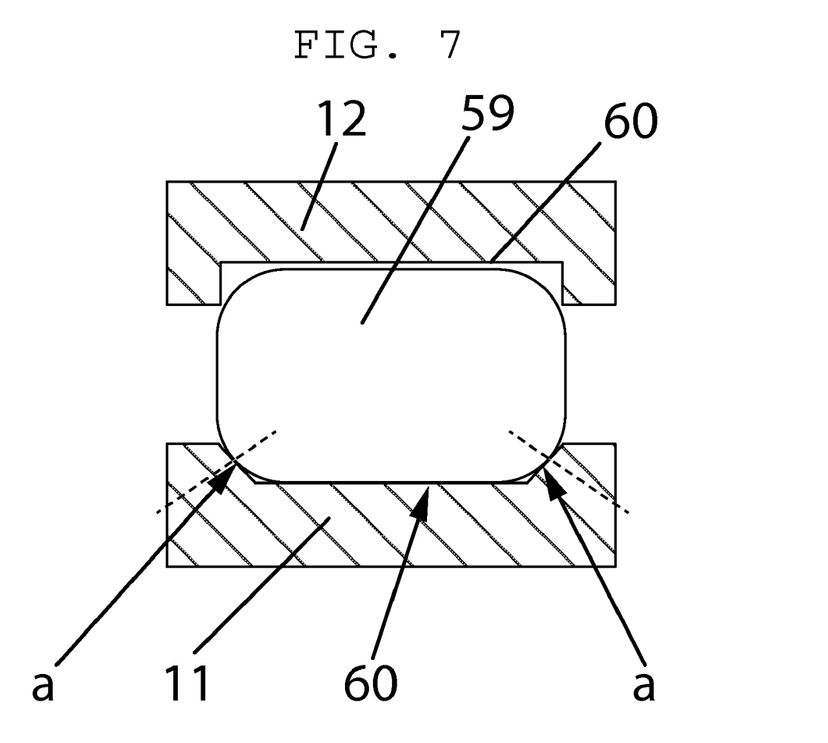
FIG. 7 is a cross sectional view of a roller bearing of the present invention in the direction perpendicular to the transfer direction (Embodiment 7).

FIG. 7 is a cross sectional view of a contact-angle changing path of a roller bearing of the present invention, The rollers and the transfer grooves, of the roller bearing contact each other along the tangent lines, and in this embodiment, each roller 59 has rounded edges, a contact-angle changing path "a" having inclined surfaces on the corners of a transfer surface 60 of the non-load region of the outer ring 11, and the rounded portions of the roller 59 are brought into contact with the contact-angle changing path "a", thereby making it possible to provide the function of securing a clearance between the adjacent rollers in the load region in the same manner as the other embodiments.

In FIG. 7, the roller 59 contacts only the contact-angle changing path "a" of the outer ring 11 while separating away from the inner ring 12. The present invention is not limited to this shape. For example, the roller may also be brought into contact with the inner ring, and surface roughness of the contact-angle changing path "a" may be rougher than the transfer surface 60 of the inner ring 12. This also provides the same function of the present invention, Crowning may be carried out to have a barrel-shaped roller (e.g., Japanese Patent Application Laid-open No. Hei-8-166014), and this crowned portion may be utilized as the R-chamfered portion.

Embodiment 8

Figure 8A:
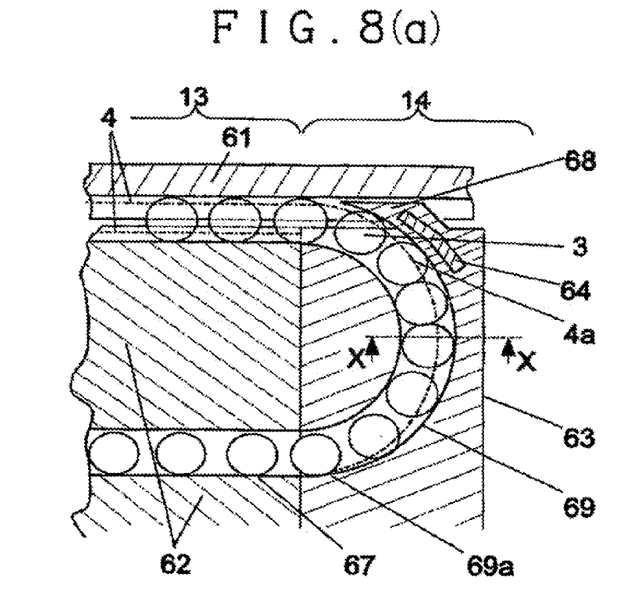
FIG. 8(a) is a cross sectional view in the circulating direction and FIG. 8(b) is a cross sectional view in the direction perpendicular to the circulating direction (Embodiment 8).

FIG. 8(a) is a cross sectional view of a portion of a circulation-type linear motion guiding apparatus, in which balls circulate from a non-load region 14 to a load region 13 of a circulation path, in which the load region 13 is made up of a slider body 62 and a rail 61, while the load region 14 is made up of a return path 67 extending through the slider body, a turnaround path 69 formed into a U-like shape in each of end caps 63 respectively secured to the opposite ends of the slider body and a tongue 68 projecting from an end cap towards the rail, and plural balls 3 are interposed in the circulation path. The entire structure of this type of the linear motion guiding apparatus is the same as disclosed in, for example, Japanese Patent Application Laid-open No. 2003-239967, and this Figure illustrates an essential portion of the present invention. This is the same as the bearing illustrated in each of FIGS. 2-6 in terms of that the balls circulate between the load region and the non-load region, and thus the present invention can be applied thereto.

Figure 8B:
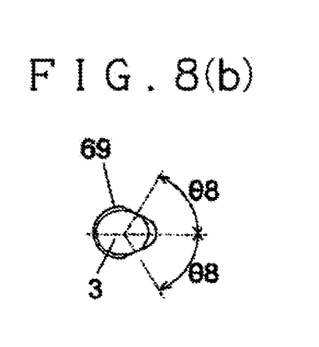

The turnaround path 69 within the end cap 63 is a communication hole having a diameter slightly greater than the ball diameter, and its cross sectional shape is determined so as to continuously change the contact angle with the balls through this path. Specifically, a contact-angle changing path, in which an approaching portion 69a of the turnaround path has a rounded cross section with an contact angle of 0°, an X-X cross section illustrated in FIG. 8(b) has a contact angle θ8 of 60°, and a portion near the tang 68 has a contact angle θ8 of 45°, is formed in an outside portion of the turnaround path 69. A dashed line 4 represents a trajectory of the contact point between the balls and the transfer groove, and a dashed line 4a represents a trajectory of the contact point of a portion in which the contact angle changes. Although it is set so that the transfer groove of the rail and the slider body, which together forms the load region, has a contact angle of 45° with the balls, and the return path has a rounded cross section with a contact angle of 0°, this is not essential. For the contact-angle changing path, a magnet 64 is embedded in an outside portion of the transfer groove of the end cap for drawing the balls towards the outside of the path.

Now, the description will be made for the function of the above structure. When the rail 61 moves to the left side, the balls 3 in the load region roll to the left side, pass through the turnaround path of the end cap (not illustrated) on the left side and the return path 67 of the slider body, and then is pushed towards the turnaround path 69 within the end cap on the right side. The contact point of each of the balls 3 within the return path 67 with the wall of the path is varied, and therefore the rotation direction of each ball is varied. However, the balls within the turnaround path 69 are guided towards the outside of the wall of the path by the action of the centrifugal force and the magnetic force (by the magnet 64) and thus a constant rotation direction can be achieved.

Due to the increase of the contact angle from the approaching portion 69a to a U-like shaped center portion, of the turnaround path, a portion of the orbital motion energy of each ball is converted into the rotation energy so that the orbital motion speed is decreased and the distance between the adjacent balls is decreased, thereby allowing the adjacent balls to contact each other or come closer to each other. Meanwhile, when the ball further orbits or revolves to the tang portion, a portion of the rotation energy of each ball is converted into the orbital motion energy due to the decrease of the contact angle so that the orbital motion speed of each ball is increased and the balls enters into the load region with the distance between the adjacent balls increased. An object of providing the magnet 64 is to securely enable the change of the contact angle even in a low-speed region in which the centrifugal force acting on the balls is insufficient, and this magnet can be optionally employed according to the speed in use, For this object, the balls 3 are made of a magnetic material.

Embodiment 9

Figure 9:
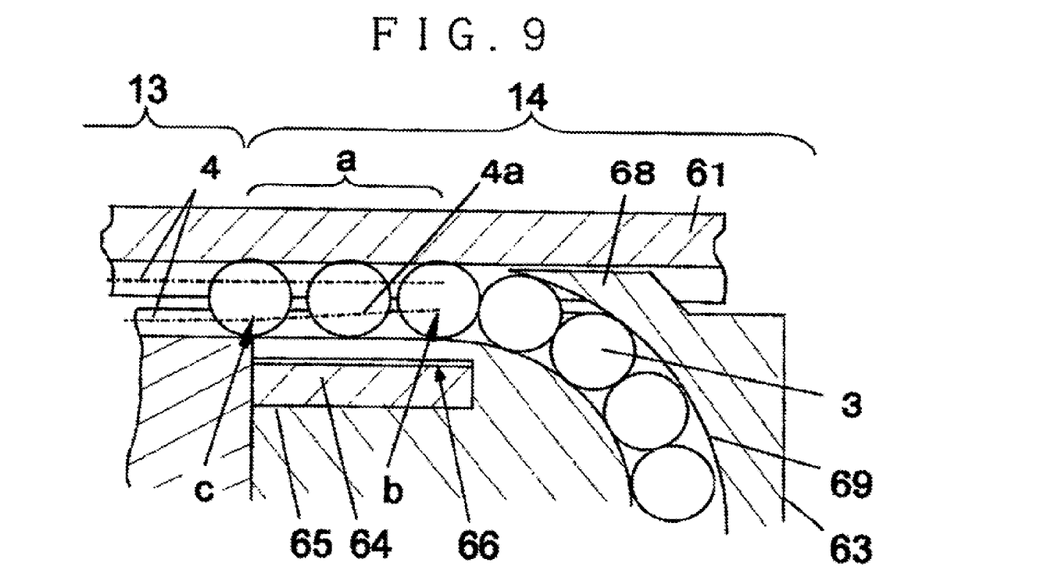
FIG. 9 is a cross sectional view of a circulation-type linear motion guiding apparatus of the present invention in the circulating direction (Embodiment 9).

FIG. 9 illustrates another embodiment of the circulation-type linear motion guiding apparatus of the present invention, and is specifically a cross sectional view illustrating a portion different from FIG. 8 regarding a portion in which balls circulate from a non-load region to a load region. A difference from FIG. 8 lies in that a transfer groove is provided to form the contact-angle changing path "a", in which the contact angle is continuously changed from a "b" portion having a contact angle of 60 on the side closer to the load region than the tang 68 of the end cap 63 is, to a "c" portion having a contact angle of 45°; an opening 65 is formed in the end cap of the inside of the transfer groove, a magnet 64 is placed in the opening; a clearance 66 is provided between the opening and the magnet, which structure allows for elastic guide of the balls through this portion; and the turnaround path 69 has a rounded cross section and thus has a contact angle not changed.

Now, the description wilt be made for the function of the above structure. When the rail 61 moves to the left sidle, the balls 3 in the load region roll to the left side, pass through a turnaround path of the end cap (not illustrated) on the left side and the return path 67 of the slider body, and then is pushed towards the contact-angle changing path from the tang 68 of the turnaround path within the end cap on the right side. The balls each rotate counterclockwise and at the same time orbit or revolve counterclockwise by the tangential force received from the rail having a contact angle of 450 at the entry of the contact-angle changing path, and the balls are drawn to the "b" portion of the transfer groove on the end cap side having a contact angle of 60° by the attraction force of the magnet 64, so that the balls orbit or revolve at a reduced speed while causing operational slippage relative to the rail 61, and thus the adjacent balls contact each other or come closer to each other. Then, due to the change of the contact angle to 45° in the distance up to the "c" portion of the transfer groove of the end cap, the orbital motion speed is increased so that the adjacent balls enter into the load region while having the distance from each other. According to this structure, since the rotation energy of a ball described in Embodiment 8 is not utilized, it is possible to provide a distance between the adjacent balls even at a very slow speed.

Embodiment 10

Figure 10:
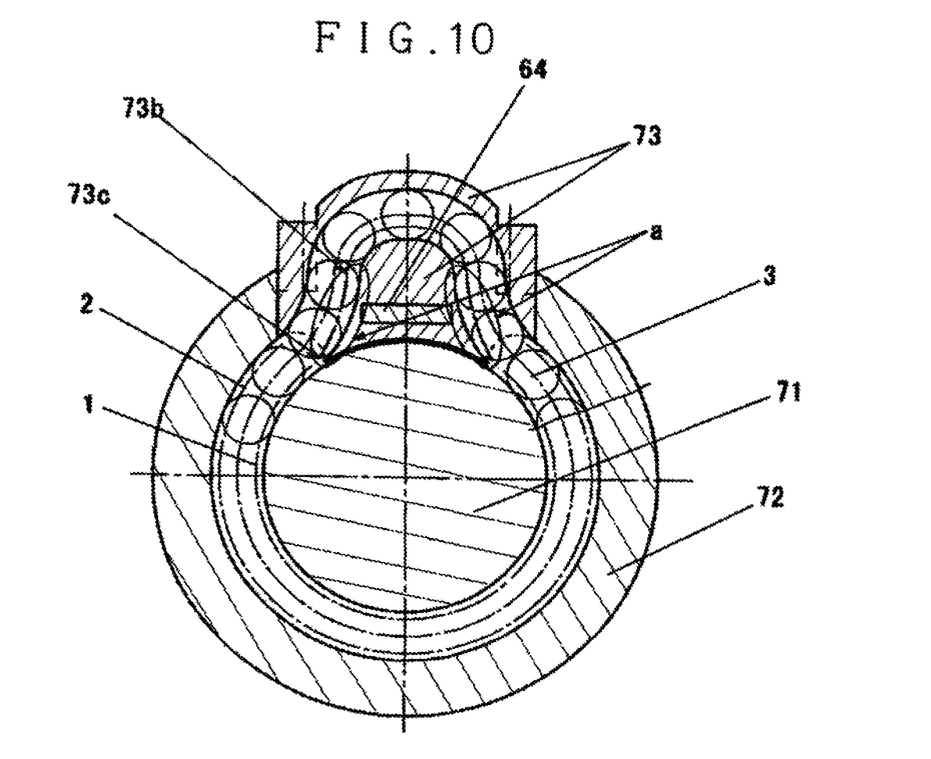
FIG. 10 is a cross sectional view of a ball screw apparatus of the present invention taken along a circulating passage (Embodiment 10).

FIG. 10 is a cross sectional view of a ball screw apparatus of the present invention along a circulation passage of the balls. A ball screw of this Figure is a circulation-type ball screw apparatus that includes a circulation passage made up of a load region that is made up of a screw shaft 71 and a nut 72 together forming spiral-shaped transfer grooves 1, 2, and a non-load region that is made up of a circulation part 73. This embodiment is the same as the circulation-type linear motion guiding apparatus of Embodiment 8 in terms of that the balls 3 circulate between the load region and the non-load region, and thus the present invention is applicable thereto. The structure other than the portion relating to the present invention is the same as that of a conventional ball screw (exemplified in, for example, Japanese Patent Application Laid-open No. 2005-83520) and therefore will be omitted.

In this embodiment, the contact-angle changing path "a" is formed in a circulation path of the circulation part between a portion 73b having an increased contact angle and a portion 73c having a decreased contact angle, in which the rotation energy of each ball is converted into the orbital motion energy by the same action as that of the circulation-type linear motion guiding apparatus of FIG. 8, so that the adjacent balls entering into the load region are spaced apart from each other. The contact-angle changing path "a" utilizes the centrifugal force acting on the balls, and therefore is curved to have a ball-contacting surface be the inner surface. In addition, even when the action of the centrifugal force by the low rotation speed is decreased due to the low rotation speed, the magnet 64 disposed on the rear side of the contact-angle changing path attracts the balls to transfer the same on the contact-angle changing path "a".

Embodiment 11

Figure 11:
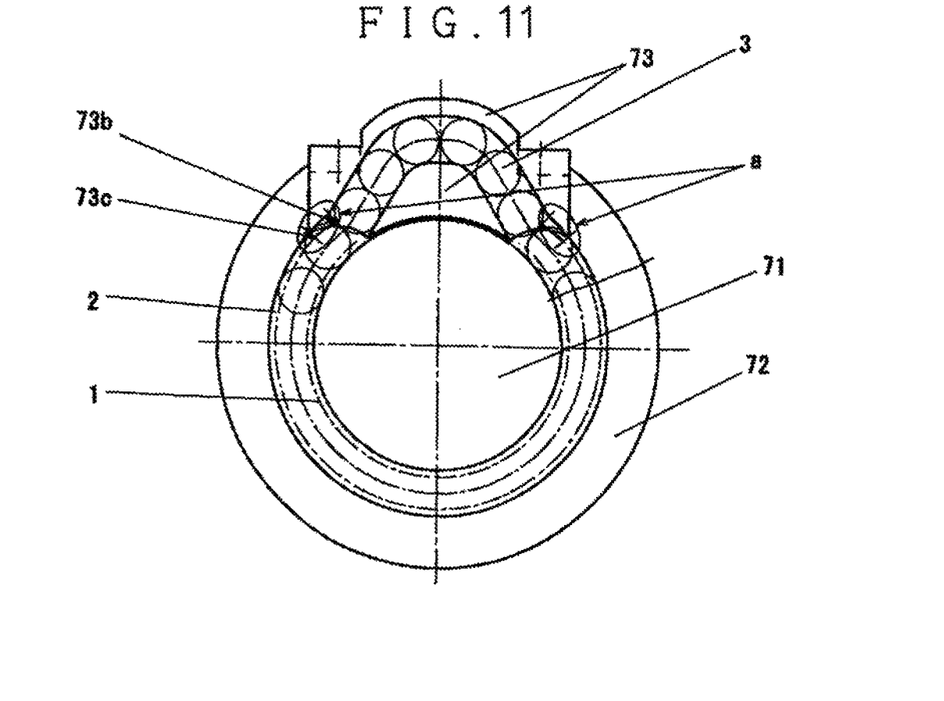
FIG. 11 is a cross sectional view of a ball screw apparatus of the present invention taken along a circulating passage (Embodiment 11).

FIG. 11 is a cross sectional view of a ball screw apparatus according to another embodiment of the present invention taken along a ball circulating passage. The contact-angle changing path "a" of this embodiment is provided in a portion in which the circulation part 73 is positioned opposite to the screw shaft 71 and extends therein between a portion 73b having an increased contact angle and a portion 73c having a decreased contact angle. The action thereof is the same as that of the circulation-type linear motion guiding apparatus of Embodiment 9, and specifically to cause operational slippage, thereby spacing the adjacent balls entering into the load region away from each other. The circulation part 73 is made of resin to reduce the rigidity and hence elastically guide the balls 3 in this portion. In order to cause the operational slippage between the balls 3 and the screw shaft 71, it is possible to employ a means of roughening the surface of the contact-angle changing path "a" of the circulation part, or a means of having a magnet attraction force separately acting. However, when the ball screw of this Figure is used at a high speed, the balls 3 are pressed onto the circulation part 73 in the contact-angle changing path "a" by the centrifugal force, and the friction force between the circulation part 73 and the balls 3 becomes greater than the friction force between the screw shaft 71 and the balls 3, and therefore the above means are not essential.

The Embodiments 10 and 11 were described by taking, for example, a case where the circulation part 73 is incorporated through the side of the nut 72, but this is not essential. It is possible to apply those embodiments to ball screws of a tube type, an end-cap type, a deflector type and the like. Furthermore, it is possible to apply those embodiments to rolling apparatuses, such as a ball spline (a rotation transmitting structure that gives infinite lead of a ball screw), and a slide bush (a linear motion guiding structure that has a rail of a ball spline to be a round shaft with no transfer groove).

Embodiment 12

Figure 12:
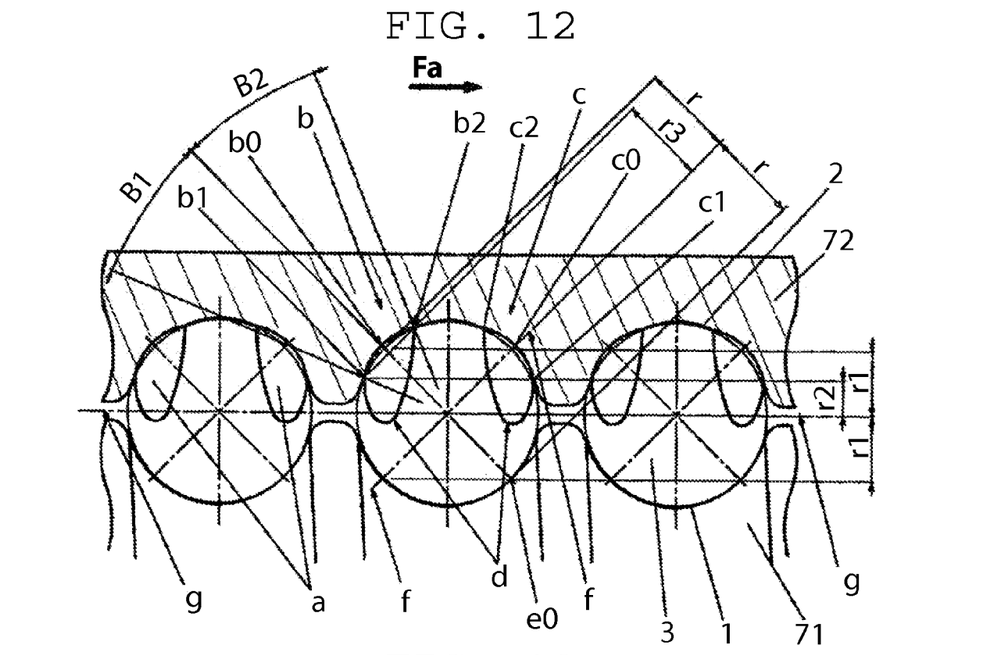
FIG. 12 is a cross sectional view of a ball screw apparatus of the present invention in the axial direction Embodiment 12).

FIG. 12 is a cross sectional view illustrating a transfer groove of the ball screw apparatus according to another embodiment of the present invention. The structure is to circulate by a circulation part (not illustrated) the balls 3 that are interposed between a spiral-shaped transfer groove 1 of a screw shaft 71 and a spiral-shaped transfer groove 2 of a nut 72. A contact-angle changing path "a" is formed within the transfer groove 2 of the nut every one turn. This Figure illustrates a portion thereof at which the contact angle has been changed to the maximum value.

The transfer grooves 1, 2 are of a gothic-arch shape having a contact angle of 45° hereinafter referred to a reference contact angle), except for a portion of the contact-angle changing path "a". The portion of the contact-angle changing path "a" of the nut has grooves b, c, at the reference contact angle position, which grooves have a curvature slightly smaller than the radius of the balls 3 and are cut to a depth greater than the surface of the gothic-arch groove, and to have a surface slightly rougher than the surface of the gothic-arch groove. More specifically, angles β1 and β2 defined by normal lines extending from the ball center to two intersecting points b1 and b2 of the groove b and the gothic-arch groove and the normal line of the reference contact angle satisfies β1<β2. The groove c has a shape symmetrical to the shape of the groove b relative to the ball center. The shapes of the grooves b, c, in the ball transfer direction are formed so that they extend both the foreside and the far side, of the Figure with the groove depth gradually decreasing, and smoothly join the gothic-arch groove (an illustrated "d" represents a ridge line between the grooves b, c and the gothic-arch groove).

Now, the description will be made for the operation of this Embodiment. The contact point of each ball and the nut when the screw shaft has been rotated in a non-loaded state is a reference contact angle position (b0, c0) in a portion other than the contact-angle changing path "a", the distance from the rotation center axis g-g of the ball to the ball contact point of the nut is r1 which is equal to the distance to the ball contact point of the shaft; and when the balls each enter into the contact-angle changing path and moves towards the center thereof, the balls 3 each contact the intersecting points b1, c1 (since the intersecting points b2, c2 are far from the reference contact angle relative to the b1 and the b2, the balls do not contact them or contact them with small contact pressure). Whereby, the distance r2 between the rotation center axis of the balls and the ball contact point is decreased so that the balls cause the operational slippage with the shaft and hence the orbital motion speed is decreased, thereby causing the adjacent balls to contact each other or come closer to each other. On the other hand, when the balls move out of the center of the contact-angle changing path the r2 is increased so that the orbital motion speed of the balls is increased and thus the balls move out of the contact-angle changing path with a space between the adjacent balls.

Now, the description will be made for the operation when the screw shaft has been rotated with a rightward axial load Fa acting to the nut in FIG. 12. The balls 3 each are subjected to the load around a left-side portion b0 of the transfer groove of the nut and a right-side portion e0 of the transfer groove of the screw shaft in a portion other than the contact-angle changing path "a", and thus the rotation center axis of the balls becomes f-f. The distance between the rotation center axis of the balls and the ball contact point of the nut (and the shaft is r, which is equal to the radius of the balls (the right-side groove of the nut and the left-side groove of the shaft do not contact the balls since the shaft and the nut are displaced by the load).

When the balls 3 each enter into the contact-angle changing path "a" and moves to the center thereof, the contact points of the balls 3 with the nut move to b1, b2, so that the distance between the ball center and the ball contact point of the nut is decreased to r3. Therefore, the orbital motion speed of the balls is decreased and hence the adjacent balls contact each other or come closer to each other. On the other hands when the balls move out of the center of the contact-angle changing path "a", the orbital motion speed of the balls is increased and hence they move out of the contact-angle changing path with a space between the adjacent balls.

The grooves b, c are formed to a depth greater than the gothic-arch groove, and therefore little load acts on the balls in this portion. Therefore, there is little adverse influences due to the contact between the adjacent balls, and therefore it is possible to prevent jostling of the adjacent balls in the gothic-arch groove portion which is subjected to the load. It is preferable to chamfer the crossing portions between the contact-angle changing path and the gothic-arch groove in order to prevent stress concentration. It is also possible to provide a given number of contact-angle changing paths at given positions of the transfer groove while not necessary to limit the contact-angle changing path to the illustrated one.

As is apparent from the drawings, the present invention is applicable to a non-circulation type ball screw. In that case, in order to prevent the drop-out of a ball from the end of the line of balls, it is possible to separately provide a holding device to interconnect the lines of the balls. In that case, the clearance between each ball and the holding device is set to be greater than an increasing and decreasing value of the distance between the adjacent balls caused within the contact-angle changing path. It is also possible to apply this embodiment in combination with the structure of Embodiment 10 or Embodiment 11, and possible to apply the groove of this embodiment to a bearing or a linear motion guiding apparatus.

Embodiment 13

Figure 13:
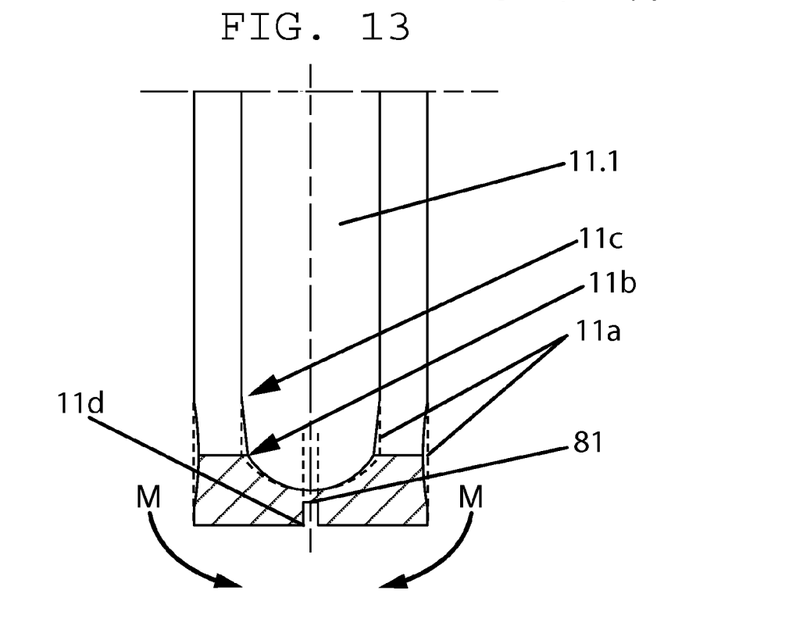
FIG. 13 is a cross sectional view of an outer ring of a bearing of the present invention in the direction perpendicular to the transfer direction, illustrating a method of forming a contact-angle changing path of the bearing (Embodiment 13).

FIG. 13 is a cross sectional view of an outer ring of a bearing of an embodiment illustrating a method Mf forming a contact-angle changing path of the bearing of the present invention. In attaching an outer ring 11 to a working machine when in working a transfer groove 1, the moment M is applied to a region forming therein the contact-angle changing path, thereby chucking the outer ring while elastically deforming the same in the direction, in which a transfer groove opens. With keeping this state, the transfer groove having a uniform cross sectional shape is worked, and then when the outer ring is detached from the working machine, the elastically deformed outer ring returns in a direction in which the radius curvature of the groove is decreased, and hence the contact-angle changing path can be formed. A broken line 11*a* in the Figure represents the shape of the transfer groove when it has been worked, and a range from 11*c* to 11*b* when the outer ring has been detached from the working machine represents the contact-angle changing path.

A groove 81 is provided to facilitate elastic deformation of the outer ring, and the necessity and the shape of the groove 81 may be determined according to the rigidity of the outer ring, the value of the moment M, or the like. When the elastic deformation in working is released an outer diameter portion of the contact-angle changing path of the outer ring expands as illustrated by 11*d*. Therefore, this portion is cut away in a downstream step, or an escape for preventing interferences is provide in a portion of a contact-angle changing path of a housing to be fitted. When a transfer groove is worked in a bearing, a linear motion guiding apparatus, or a rolling guide apparatus such as a ball screw, working is made by using a rotary cutting tool in rolling, cutting or grinding, which is moved in the transfer direction, since the transfer groove has generally a uniform cross section relative to the transfer direction. According to the working method of this embodiment, it is possible to easily form a contact-angle changing path without the necessity of great modification of these working machines.

INDUSTRIAL APPLICABILITY

The rolling apparatus, the manufacturing method and the method of its use, of the present invention are applicable to a bearing apparatus, a ball screw apparatus and a guiding apparatus having rolling elements interposed therein, which are widely used in industries.

The invention claimed is:

1. A rolling apparatus comprising a transfer path made up of at least one pair of transfer grooves; and plural rolling elements interposed in the transfer path in such a manner as to be capable of freely rolling, wherein the rolling elements have any one of a spherical shape, a cylindrical shape having opposite corners three-dimensionally curved, a conical shape, a barrel shape and a complex curved shape thereof; said transfer path has a region that allows the rolling elements to contact only one of the transfer grooves of the transfer path, or a region that has a friction force acting between one of the transfer grooves of the transfer path and the rolling elements being greater than the friction force acting between another one of the transfer grooves of the transfer path and the rolling elements; said one of the transfer grooves in said region has a cross sectional shape taken in a direction perpendicular to the direction, in which the rolling elements are transferred, which cross sectional shape allowing two point contact with the rolling elements; and said rolling apparatus further has a contact-angle changing path that has a contact angle with the rolling elements that is greater than the contact angle of the other portion of the transfer path, wherein the groove at which said contact-angle changing path is formed is composed to be able to move relative to its facing groove in the transfer direction of the rolling elements.

2. The rolling apparatus according to claim 1, wherein, for the transfer path that has said region that allows a friction force acting between one of the transfer grooves of the transfer path and the rolling elements to be greater than the friction force acting between another one of the transfer grooves of the transfer path and the rolling elements, the rigidity in a direction perpendicular to the transfer direction is smaller than the other portion of the transfer path, or the distance between the transfer grooves is greater than the other portion to have a non-load region that allows the rolling elements to be slightly held between the transfer grooves.

3. The rolling apparatus according to claim 2, wherein the surface of the contact portions of the contact-angle changing path with the rolling elements is rougher than the surface of the contact portions of the opposite transfer groove with the rolling elements.

4. The rolling apparatus according to claim 2, wherein the shape of the contact-angle changing path in the transfer direction is curved in such a direction as to have the contacting surface with the rolling elements be an inner surface.

5. The rolling apparatus according to claim 2, wherein a ferromagnetic material is used as the material of the rolling elements and magnetic force is applied to the contact-angle changing path.

6. The rolling apparatus according to claim 2, wherein the contact angle at a center of the contact-angle changing path is greater than the contact angle of any one of the other portion of the transfer path and the circulation path, and is gradually decreased towards the opposite ends thereof.

7. The rolling apparatus according to claim 2, wherein a means for deforming the transfer grooves to change the contact angle relative to the transfer direction of the rolling elements in the contact-angle changing path is provided in an external structure of the transfer grooves.

8. The rolling apparatus according to claim 1, wherein the surface of the contact portions of the contact-angle changing path with the rolling elements is rougher than the surface of the contact portions of the opposite transfer groove with the rolling elements.

9. The rolling apparatus according to claim 1, wherein the shape of the contact-angle changing path in the transfer direction is curved in such a direction as to have the contacting surface with the rolling elements be an inner surface.

10. The rolling apparatus according to claim 1, wherein a ferromagnetic material is used as the material of the rolling elements and magnetic force is applied to the contact-angle changing path.

11. The rolling apparatus according to claim 1, wherein the contact angle at a center of the contact-angle changing path is greater than the contact angle of any one of the other portion of the transfer path and the circulation path, and is gradually decreased towards the opposite ends thereof.

12. The rolling apparatus according to claim 1, wherein a means for deforming the transfer grooves to change the contact angle relative to the transfer direction of the rolling elements in the contact-angle changing path is provided in an external structure of the transfer grooves.

13. A circulation-type rolling apparatus comprising a transfer path made up of at least one pair of transfer grooves; plural rolling elements interposed in the transfer path in such a manner as to be capable of freely rolling; and a circulation path having opposite ends connected to one of the transfer grooves so as to allow the rolling elements to be capable of being circulated; wherein the rolling elements have any one of a spherical shape, a cylindrical shape having opposite corners three-dimensionally curved, a conical shape, a barrel shape and a complex curved shape thereof; wherein the rolling elements within the transfer path are drawn into the circulation path through one end of the circulation path and returned through the opposite end of the circulation path to the transfer path; at least one end of the circulation path has a cross sectional shape taken in a direction perpendicular to the direction, in which the rolling elements are circulated, which cross sectional shape allowing two point contact with the rolling elements; and said rolling apparatus further has a contact-angle changing path that has a contact angle with the rolling elements that is greater than the contact angle of the transfer path.

14. The rolling apparatus according to claim 13, wherein the shape of the contact-angle changing path in the transfer direction is curved in such a direction as to have the contacting surface with the rolling elements be an inner surface.

15. The rolling apparatus according to claim 13, wherein a ferromagnetic material is used as the material of the rolling elements and magnetic force is applied to the contact-angle changing path.

16. The rolling apparatus according to claim 13, wherein the contact angle at a center of the contact-angle changing path is greater than the contact angle of any one of the other portion of the transfer path and the circulation path, and is gradually decreased towards the opposite ends thereof.

17. The rolling apparatus according to claim 13, wherein a means for deforming the transfer grooves to change the contact angle relative to the transfer direction of the rolling elements in the contact-angle changing path is provided in an external structure of the transfer grooves.

\* \* \* \* \*